(12) United States Patent
Benteo et al.

(10) Patent No.: US 10,007,773 B2
(45) Date of Patent: Jun. 26, 2018

(54) METHOD FOR GENERATING PUBLIC IDENTITY FOR AUTHENTICATING AN INDIVIDUAL CARRYING AN IDENTIFICATION OBJECT

(71) Applicant: MORPHO, Issy les Moulineaux (FR)

(72) Inventors: Bruno Benteo, Issy les Moulineaux (FR); Philippe Bertiaux, Issy les Moulineaux (FR)

(73) Assignee: MORPHO, Issy les Moulineaux (FR)

( * ) Notice: Subject to any disclaimer, the term of this patent is extended or adjusted under 35 U.S.C. 154(b) by 0 days. days.

(21) Appl. No.: 14/382,920

(22) PCT Filed: Mar. 18, 2013

(86) PCT No.: PCT/FR2013/050575
§ 371 (c)(1),
(2) Date: Sep. 4, 2014

(87) PCT Pub. No.: WO2013/140079
PCT Pub. Date: Sep. 26, 2013

(65) Prior Publication Data
US 2015/0046699 A1 Feb. 12, 2015

(30) Foreign Application Priority Data
Mar. 19, 2012 (FR) ...................... 12 52444

(51) Int. Cl.
*G06F 21/34* (2013.01)
*G06F 21/35* (2013.01)
(Continued)

(52) U.S. Cl.
CPC .............. *G06F 21/34* (2013.01); *G06F 21/32* (2013.01); *G06F 21/35* (2013.01);
(Continued)

(58) Field of Classification Search
CPC .......... G06F 21/32; G06F 21/34; G06F 21/35; H04L 63/0861; H04L 9/3231; H04L 9/3234; H04W 12/06
See application file for complete search history.

(56) References Cited

U.S. PATENT DOCUMENTS 6,463,533 B1 10/2002 Calamera et al.
8,516,269 B1 * 8/2013 Hamlet et al. ................ 713/189
(Continued)

FOREIGN PATENT DOCUMENTS

WO 2010/116310 A1 10/2010

OTHER PUBLICATIONS

U.S. Appl. No. 14/380,535, filed Aug. 22, 2014, Berteau, et al.
U.S. Appl. No. 14/377,717, Benteo.

*Primary Examiner* — Theodore C Parsons
(74) *Attorney, Agent, or Firm* — Christensen O'Connor Johnson Kindness PLLC

(57) ABSTRACT

A method for generating a public identity for authenticating an individual carrying an identification object, the method including: entering an initial biometric datum of the individual; generating a first key from the biometric datum; generating a second key derived from a datum generated by a security component of the object; generating an initial encryption key combining the first key and the second key; communicating with a server a first identity of the individual in connection with the initial encryption key; generating by the server a public identity by encrypting the first identity using the initial encryption key, the public identity being stored by the server in connection with the initial encryption key. The public identity is not significant, but is secured by a strong connection between the object and biometry of the individual.

19 Claims, 3 Drawing Sheets

(51) Int. Cl.
  *G06F 21/32* (2013.01)
  *G06F 21/62* (2013.01)
  *H04L 9/32* (2006.01)
  *H04L 29/06* (2006.01)
  *H04W 12/06* (2009.01)

(52) U.S. Cl.
  CPC ........ *G06F 21/6227* (2013.01); *H04L 9/3231* (2013.01); *H04L 9/3234* (2013.01); *H04L 63/0861* (2013.01); *H04W 12/06* (2013.01)

(56) References Cited

U.S. PATENT DOCUMENTS

| | | | |
|---|---|---|---|
| 8,667,265 B1* | 3/2014 | Hamlet et al. | 713/150 |
| 8,868,923 B1* | 10/2014 | Hamlet | H04L 9/00 326/8 |
| 2005/0240779 A1* | 10/2005 | Aull et al. | 713/186 |
| 2007/0118891 A1* | 5/2007 | Buer | 726/8 |
| 2007/0198848 A1* | 8/2007 | Bjorn | G06F 21/35 713/186 |
| 2009/0010503 A1* | 1/2009 | Mathiassen et al. | 382/125 |
| 2009/0070860 A1* | 3/2009 | Hirata | G06F 21/32 726/5 |
| 2009/0320118 A1* | 12/2009 | Muller et al. | 726/9 |
| 2011/0002461 A1* | 1/2011 | Erhart et al. | 380/44 |
| 2011/0191837 A1 | 8/2011 | Guajardo Merchan et al. | |
| 2012/0033807 A1 | 2/2012 | Asim et al. | |
| 2012/0066497 A1* | 3/2012 | Kumar et al. | 713/168 |
| 2012/0089520 A1* | 4/2012 | Mardikar | 705/71 |
| 2012/0303966 A1* | 11/2012 | Hubner | 713/186 |
| 2013/0010957 A1* | 1/2013 | Yu et al. | 380/260 |
| 2014/0237256 A1* | 8/2014 | Ben Ayed | 713/186 |

\* cited by examiner

METHOD FOR GENERATING PUBLIC IDENTITY FOR AUTHENTICATING AN INDIVIDUAL CARRYING AN IDENTIFICATION OBJECT

The present invention relates to the generation of a public identity for the authentication or identification of an individual with the use of an electronic device.

Note that when the words "authentication or identification" are used in the present text, the "or" is understood to be the inclusive "and/or", such that the present invention applies equally for authentication and for identification, or even for both.

The purpose of identification is to know the identity of an entity, for example using an identifier that can be a user name or a network identifier (such as a phone number). Authentication allows verifying the identity of an entity in order to allow access to services or resources.

Authentication or identification normally uses a server where data concerning entities are stored. These entities are individuals who have previously undergone a registration phase with said server in order to be issued some right once they are authenticated or identified (issuance of a driver's license, ticket, or compensation, access authorization for an area, access authorization for a service, use of a service, epayment, etc.).

The data conventionally used for registering individuals with the server are personal data, usually alphanumeric, such as passwords, addresses of electronic devices used by individuals (such as IP address), identities, and/or other data.

To be sufficiently discriminating and allow authentication or identification with an acceptable level of success, the data used can be relatively complex from the individual's point of view. For example, the more characters a password contains, the more reliable the identification, but the more difficult it becomes for the individual to remember it.

Furthermore, the concept of identity is becoming pervasive and routine in the digital environment, and particularly in the mobile environment. For example, a communicating object such as a smart card, smart phone, digital tablet, or the like, can be used as the identification medium. This object then needs to be usable by its holder in a secure and reliable manner, while remaining ergonomic to use.

Biometric data can be used in association with a communicating object to ensure the uniqueness of the individual carrying the object. A biometric passport, for example, is such a secure identification object.

When biometric data are used in association with an identification object, the anonymity of the holder must be preserved. To achieve this, the registration server may only contain weak links between the biometric data of the holder and his or her identity; one can refer for example to document FR-A-2867881. Similarly, the biometric data may only be stored in the object of the holder without sharing with a database. Reading the biometric data from the identification object is subject to mutual authentication between the security element of the object (for example an electronic chip) and a remote server via a component of the object (for example according to the EAC protocol or Extended Access Control), allowing verification in local mode (data within the object of the holder) and/or in remote mode where information is shared with a server.

Such a procedure, designed for verifying the official national identity of individuals, is difficult to generalize to everyday applications which still require authenticating individuals.

There is however a need to generalize the use of biometrics for authenticating a holder of an identification medium while protecting his or her digital identity and rights.

The invention aims to meet this need.

The invention thus provides a method for generating a public identity for authenticating an individual carrying an identification object comprising at least one security component, said method including an initialization phase comprising the following steps:

capture of initial biometric data of the individual;
generation of a first key from the biometric data;
generation of data by a security component of the object;
generation of a second key derived from the data generated by the security component of the object;
generation of an initial encryption key combining said first key and said second key;
communication, with a server, of a first identity of the individual in association with the initial encryption key;
generation, by the server, of a public identity by encrypting the first identity using the initial encryption key,
said public identity being stored by the server in association with the initial encryption key.

A first aspect of the invention consists of an initialization phase. The purpose of this initialization phase is to register the individual together with an identification object of his or her choice—mobile phone, card, tablet, or some other object—on a server that will issue a public identity. The public identity issued by the server at the end of the registration phase is not significant, meaning that in no case does it allow directly retrieving the civil data of the holder, although it is constructed from a strong link between the object and the biometrics of the individual. The identification object cannot be used in a valid manner without its legitimate holder.

According to some embodiments, the initialization phase of the method according to the invention may further comprise one or more of the following characteristics:

The data generated by the security component of the object may be an unpredictable numerical value (PUF, Physical Unclonable Feature) produced by the security component of the object or a random number stored in the security component of the object after generation.

The first key is obtained by applying a signature and/or encryption function to reference digital data derived from the biometric data. This first key may be generated in the security component of the identification object or in a third secure element.

The second key is generated in the security component of the identification object.

The initial encryption key may be generated by the security component of the identification object and then transmitted to the server, or may be generated by the server.

According to one application, key derivation can be introduced for the initial encryption key. For example, the server may derive a key from the initial encryption key before generating the public identity, or the first or second key can be generated by introducing a key derivation received from the server. The introduction of key derivation for the encryption key when creating the public identity allows creating a public identity specific to each service provider. Each digital identity derived in this manner can be associated with audit functions specific to the service concerned.

According to one embodiment, a plurality of derived public identities can be generated and stored on the server or on a plurality of servers in association with a respective derived initial encryption key.

The public identity or identities may also be transmitted and stored in the identification object for subsequent use as an identifier with a server when requesting access to services.

The method according to the invention also comprises a verification phase for verifying the identity of the individual carrying the identification object. This verification phase comprises the following steps:
  capture of current biometric data of the individual;
  generation of current data by the security component of the object;
  generation of a current encryption key from the current biometric data and from the current data generated by the security component of the object;
  comparison of said current encryption key with the initial encryption key;
  if the comparison is positive, the identity of the individual carrying the identification object is validated;
  if the comparison is negative, the identity of the individual carrying the identification object is refuted.

Depending on the implementation, the comparison may be performed in the security component of the identification object and/or at the server.

A second aspect of the invention consists of a verification phase for verifying the identity of the individual carrying the identification object. With the method of the invention, an individual does not need to give his or her official national identity to prove that the individual has the right to access services for which he or she has registered with the selected object. The public identity constructed during the initialization phase can be validated simply by providing the object and the biometrics of the object holder. In this context, the use of biometrics protects the anonymity of the individual.

The invention also relates to an electronic device comprising a security component adapted to implement the steps of the method according to the invention. Such a device may further comprise means for capturing biometric data. According to one implementation, the electronic device may access memory where a plurality of derived public identities are stored. The same electronic device can then be used as an identifier for accessing completely separate services that have no connections to each other.

The invention also relates to a system for authenticating a holder of an identification object, said system comprising an electronic device according to the invention and at least one authentication server comprising at least one public identity stored in association with an initial encryption key. According to one embodiment, the system comprises a plurality of authentication servers each comprising at least one public identity stored in association with a derived initial encryption key.

Other features and advantages of the invention will be apparent from the following description of some non-limiting exemplary embodiments, with reference to the accompanying drawings where:

A first aspect of the invention consists of an initialization phase. The aim of this initialization phase is to register an individual associated with an identification object of his choice—mobile phone, card, tablet, or other object—with a server to allow subsequently issuing some right to the individual (issuing a driver's license, ticket, or compensation, access authorization for an area, access authorization for a service, use of a service, epayment, etc.) upon presentation of the object.

The identification object may be a smart card, a mobile phone, or some other portable object having at least one security component. The identification object can be used as a loyalty card, a membership card for access to services, an insurance card, or a medium for an official national identity.

Figure 1:
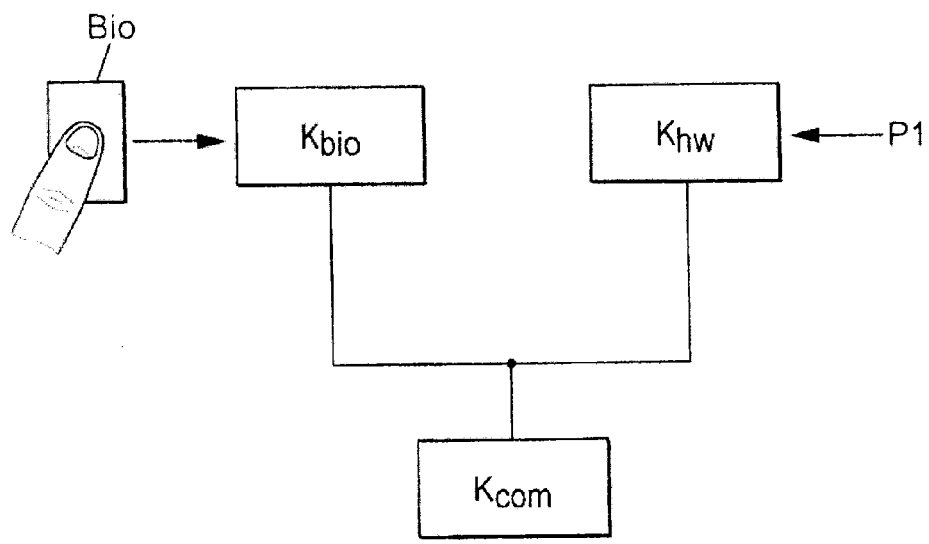
FIG. 1 is a flowchart of an example initialization phase when implementing the method according to the invention.

The initialization phase is shown in FIG. 1.

Initial biometric data Bio of the individual is entered. These initial biometric data Bio can be a digital fingerprint, an iris image, or a photo of the face, ear or other identifying part of the individual's body such as a tattoo, scar, or the like. These initial biometric data Bio of the individual is digitized and processed to create digital reference data derived from the initial biometric data. Only the digital reference data derived from the initial biometric data is stored in the security component of the object. The initial biometric data Bio does not have to be stored in the identification object. No misuse of the biometric data of an individual can then occur if the identification is lost or stolen.

This initial biometric data Bio is used to generate a first key $K_{bio}$. This first key $K_{bio}$ may be obtained by applying a signature and/or encryption function to the digital data derived from the biometric data.

Signature data P1 is generated by the security component of the object. These data P1 is unpredictable and depends solely on the electronics of the security component of the object; it is not stored in the memory of the identification object but is generated at each use as a signature for the electronic security component. Such data P1 can be designated by the acronym PUF for "Physical Unclonable Feature"; it consists of a series of non-predictable binary values that are not available outside the object. Alternatively, the signature data P1 generated by the security component of the object may also be a random number stored in the security component of the object after generation.

This signature data P1 of the security component of the object is used to generate a second key $K_{HW}$ for example the values of the PUF or of the random number generated by the security component of the object can be used directly or after encryption to form a key.

An initial encryption key $K_{com}$ can then be determined. This initial encryption key combines the first and second keys $K_{bio}$ and $K_{HW}$, for example with an algorithm that uses one of the first or second keys to encrypt the other.

This initial encryption key $K_{com}$ is then used with an authentication server to register the individual with said server so that he or she can be issued some right during a subsequent authentication, upon presentation of the object and verification of the authenticity of the object-holder pair.

Figure 2:
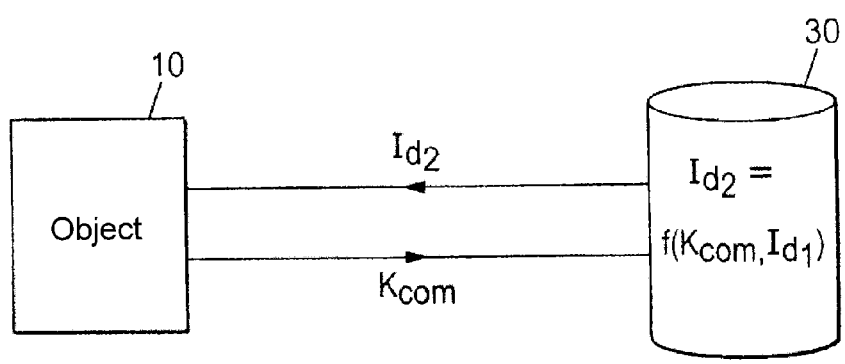
FIG. 2 is a diagram showing an example initialization phase which can be implemented according to an embodiment of the invention.

This registration step is illustrated in FIG. 2, which shows the identification object 10 and an authentication server 30.

The identification object 10 chosen by the individual has generated an initial encryption key $K_{com}$ as described with reference to FIG. 1. This initial encryption key $K_{com}$ is communicated to the server 30 in association with a first identity Id1 of the individual. This first identity Id1 of the individual may be his official national identity or a login ID chosen by the individual for a particular service (login for facebook, for an online retailer, etc.).

The server 30 then generates a public identity Id2 by encrypting the first identity Id1 using the initial encryption key $K_{com}$, by a standard public-key cryptography process (PKI for "Public Key Infrastructure") for example.

The public identity Id2 is then stored on the server 30 in association with the initial encryption key $K_{com}$ to allow subsequent authentication of the individual. The public identity Id2 may also be sent to the identification object 10 for storage. This public identity Id2 is not necessarily stored securely because it is not significant, as explained above. However, the initial encryption key $K_{com}$ may be stored in the security component of the object 10 for later use in a process known as MOC for "Match On Card."

Figure 3:
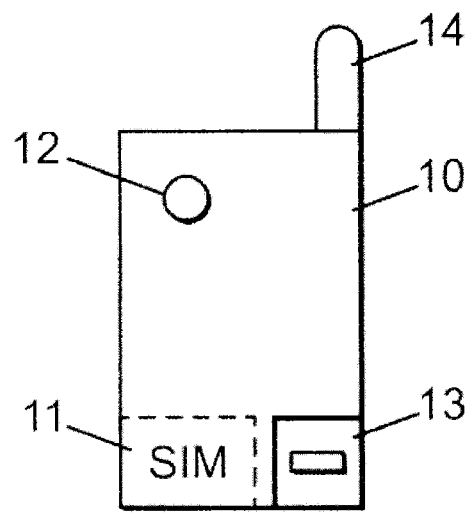
FIG. 3 is an example of an identification object which can be used when implementing the method according to the invention.
Figure 4:
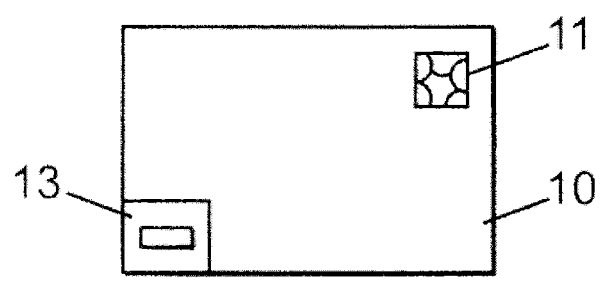
FIG. 4 is another example of an identification object which can be used when implementing the method according to the invention.

FIGS. 3 and 4 illustrate examples of identification objects that can be used as part of the invention. For example, the identification object 10 may be a mobile phone (FIG. 3) comprising a security component 11 provided in a SIM card or any other embedded security element. The phone 10 may comprise a means for capturing images 12 and/or sound and/or a fingerprint reader 13, or any other means for capturing biometric data. The phone 10 also comprises means 14 for communication with a cellular network; it may also include means for communication with a local area network (Wifi or Bluetooth) or means for near field communication (NFC). The phone 10 can thus communicate with an authentication server to enable access to the rights or services requested by the holder after verification of his or her identity.

According to another example, the identification object 10 may be a smart card (FIG. 4) comprising a security element 11 in the form of a chip in the card. The card 10 may include a digital fingerprint reader 13 or any other means for capturing biometric data. The card 10 reads data from the chip 11 via an appropriate reader in contact mode and/or by contactless communication means such as near-field communication (NFC) via an antenna 10 in the card 10. This allows the card 10 to communicate, for example, with a terminal or telephone to initiate access to the rights and services requested by the holder after identity verification. Identity verification for an individual using a smart card 10 is performed according to the same process as the one described for a telephone with reference to FIG. 3.

Depending on the embodiment, the various elements described above may be distributed differently between the identification object 10 and the authentication server 30.

According to a first possible embodiment, the first key $K_{bio}$, the second key $K_{HW}$, and the initial encryption key $K_{com}$ are generated in the security component of the object and only the initial encryption key is transmitted to the server 30 (as illustrated in FIG. 2).

For example, the biometric data Bio can be entered by the individual using the identification object 10 itself, for example when the identification object is a mobile phone equipped with a camera or a fingerprint reader as described below with reference to FIG. 3. The first key $K_{bio}$ may then be generated by the identification object 10 itself, by applying to the captured biometric data an algorithm stored in the security component of the object, for example an algorithm to create a stable digital signature as described in patent FR-A-2925732, and then applying an encryption function such as a hash function for example. The digital reference data derived from the captured biometric data may additionally be stored in the security component of the object for possible subsequent use in an MOC process.

Alternatively, the biometric data Bio may be entered from an appropriate reader which sends it to the identification object 10 for generation of the first key $K_{bio}$. The biometric data Bio may be transmitted directly to the identification object 10, by near field communication NFC for example if the object has this function, or by cellular or wireless communication if the object has this function; the object 10 itself then calculates digital reference data derived from the biometric data. Alternatively, the digital reference data derived from the biometric data Bio can be calculated in the capturing means and then transmitted directly to the identification object 10, by near field communication NFC or by cellular or wireless communication.

The second key $K_{HW}$ is generated in the security component of the object 10 because the data P1 is generated by the security component of the object and cannot be transmitted outside the object 10.

If the first key $K_{bio}$ and second key $K_{HW}$ are generated in the security component of the object 10, it is advantageous for the initial encryption key $K_{com}$ also to be generated in the security component of the object 10 in order to limit the exchange of sensitive data.

According to another possible embodiment, the initial encryption key $K_{com}$ may be generated directly by the server 30 which receives the first and second keys $K_{HW}$ and $K_{bio}$ in a secure manner.

For example, the biometric data Bio can be captured by an appropriate reader such as a fingerprint reader or webcam installed on a PC for example. The first key $K_{bio}$ can then be generated either by a third secure element having collected the secure biometric data Bio, or by the server 30 if the biometric data Bio or the digital reference data derived from the biometric data is sent to it.

Although the data P1 generated by the security component of the object are not available outside of the object 10, the second key $K_{HW}$ generated in the security component of the object 10 can be transmitted outside of the object.

Where appropriate, if the initial encryption key $K_{com}$ was generated by the server 30, it can be transmitted to the identification object 10 for storage therein for use in a subsequent MOC process.

Whether the initial encryption key $K_{com}$ is generated by the server 30, or by the security component of the object 10 and then sent to the server, the initial encryption key $K_{com}$ is used by the server to create a public identity Id2 by encrypting the first identity Id1.

The server 30 may introduce key derivation for the initial encryption key $K_{com}$ before generating the public identity Id2. The introduction of such key derivation for the encryption key when creating the public identity Id2 allows creating a public identity specific to the server that created it. In particular, a plurality of derived public identities Id2$n$ can be generated and stored on one or more servers. Each of the derived public identities Id2$n$ is stored in association with a respective derived initial encryption key. Each digital identity derived in this manner can be associated with specific rights on the server for a specific service.

For example, an individual wants to use the same identification object to register with servers for different services. To provide audit functions specific to the service concerned—including repudiation or level of security—it is preferable that the public identity Id2 not be the same for all services. A derived key originating from the server of the provider is therefore introduced during generation of the public identity Id2.

Depending on the embodiments, the key derivation may be introduced directly by the server 30 for the initial encryption key $K_{com}$ before generation of the public identity Id2, whether the encryption key $K_{com}$ is generated by the server or by the security component of the object that then receives the key derivation from the server when it generates the initial encryption key $K_{com}$. Alternatively, the derivation can be introduced during generation of the first key $K_{bio}$ or second key $K_{HW}$, or by the server itself if it generates the first key $K_{bio}$ as mentioned above, or by the security component of the object which then receives the key derivation from the server.

The same identification object can then be used by the individual in order to access different services once his or her identity is verified.

Figure 5:
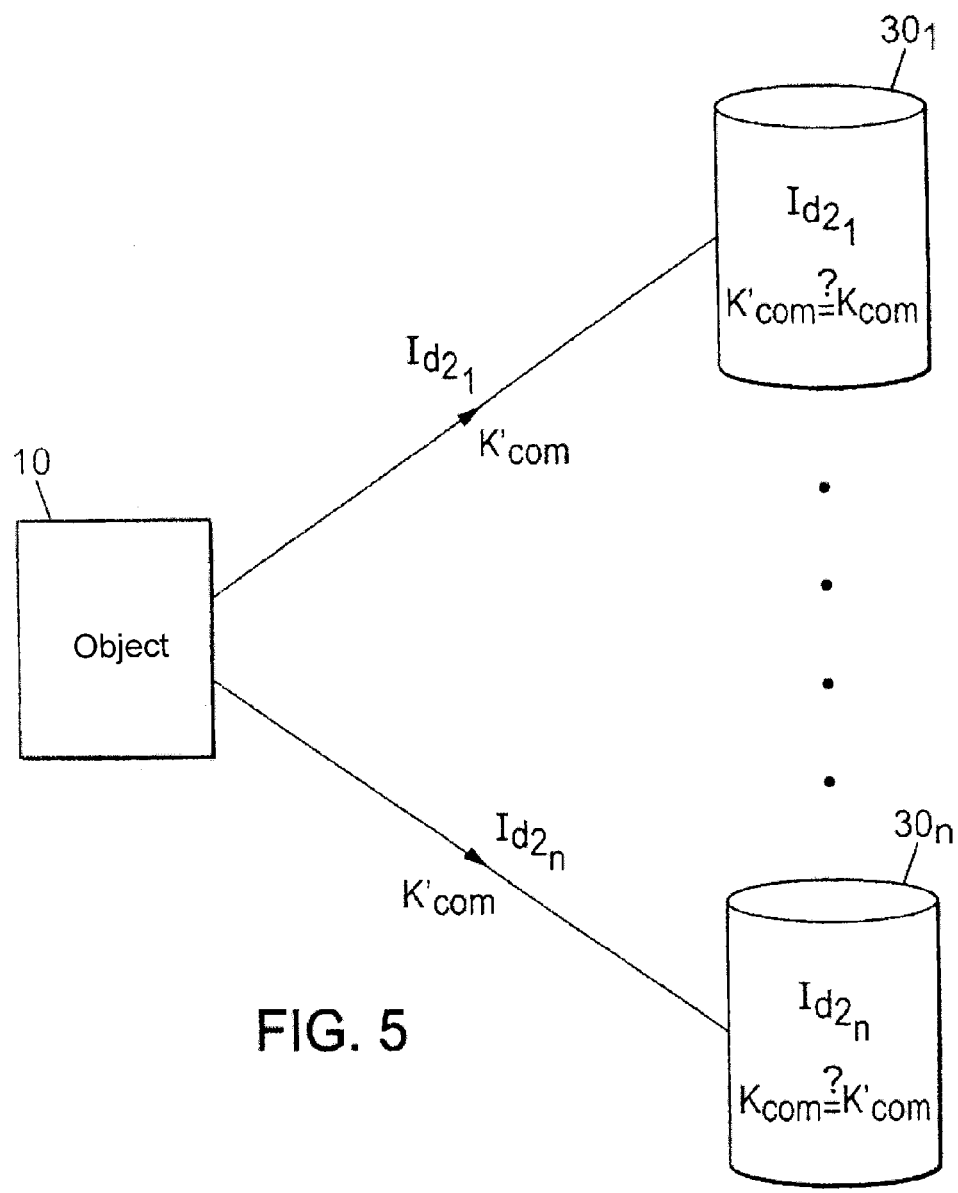
FIG. 5 is a diagram showing an example of a verification phase which can be implemented according to an embodiment of the invention.

The verification phase is illustrated in FIG. 5.

An individual wishes to access a given service with which he or she is registered under a given public identity Id2*n*.

Verification of the identity of the individual is achieved by generating a common encryption key $K_{com}'$, according to the same method as described with reference to FIG. 1, using current biometric data Bio' and current data P1' generated by the identification object 10—card, phone, or the like. If key derivation was introduced during generation of the initial encryption key $K_{com}$, the same derivation is introduced in the same manner during generation of the current encryption key $K_{com}'$.

Possibly, the digital data derived from the current biometric data Bio' is validated internally by a comparison made within the object itself, using an MOC process. The comparison between the current encryption key $K_{com}'$ and the initial encryption key $K_{com}$ can be done inside the object by an MOC process before transmitting said current encryption key $K_{com}'$ or providing proof of identity to a server or terminal for accessing the rights or services requested.

In the absence of an MOC process, or as an addition, the server 30*n* receives the common encryption key $K_{com}'$ and compares it with the initial encryption key $K_{com}$. If the comparison is positive, the identity of the individual is validated and the requested rights are granted; otherwise the identity of the individual is denied and the requested rights are refused. The use of derived public identities Id2*n* limits the ability to deny a service even when the same identification object is used by the individual.

The same identification object can then be used by the individual to establish secure communication with a remote server, with the object able to serve as the GUI, keyboard and modem, possibly in addition to the standard exchange of information within an existing infrastructure (banking, risk management, health care, etc.).

Such identification may be used within virtual transactions to control fraud and prevent repudiation of transactions, as the verification of the identity of the individual using the identification object is based on biometric data.

Transmission of data—Bio, $K_{com}$, Id2 or their derived values—can be direct or through one or more intermediate devices, such as the case where transmission occurs over a communication network. The transmitted data can be in any format. Advantageously, these transmissions are secure. For this purpose, any appropriate procedure for secure transmissions can be considered, such as the use of HTTPS, SSL/TLS, or some other protocol. A single server 30 may be used or multiple entities may provide respective functions; one such entity could be dedicated to calculations or to storing data related to the biometric values used, and another entity could be dedicated to storage and comparison of digital identities.

Advantageously, the personal data of the individual may be transmitted to the server 30 in the same configurations as for the first identity Id1. These personal data may include any data that could be used as part of an authentication or identification. As an illustration, they may include at least one among: a password, a digital address for the identification object, an identity, or some other data. In this case, the various data concerning the individual are stored in association, by or for the server 30. Thus, each data associated with a digital identity can be used for separate functions or services (local or remote).

One will note that although the above description has been described with the assumption that only initial biometric data is captured during the initialization phase, the invention also applies if additional biometric data are captured and combined in the generation of the first key $K_{bio}$.

Other mechanisms and other architectures are of course also possible, as will be apparent to a person skilled in the art, especially distributions different from those illustrated in FIGS. 2 and 5.

Some or all of the operations described above can be implemented by one or more computer programs comprising appropriate code instructions suitable for implementing the method of the invention. Such a computer program can be loaded and executed on the security component of a communicating identification object.

The invention claimed is:

1. A method for generating a public identity for authenticating an individual carrying an identification object including at least one security component, the method comprising:
    an initialization phase including:
        capturing initial biometric data of the individual;
        generating a first key by applying a hash function to the biometric data, wherein the first key is generated in the security component of the identification object;
        generating a second key based on data generated by the security component of the object only, the second key being generated in the security component;
        generating an initial encryption key combining the first key and the second key;
        communicating, with a server, a first identity of the individual in association with the initial encryption key; and
        generating, by the server, a public identity by encrypting the first identity using the initial encryption key, the public identity being stored on the server in association with the initial encryption key, wherein the server introduces a key derivation function for the initial encryption key before generating the public identity.

2. The method according to claim 1, wherein the data generated by the security component of the object is an unpredictable numerical value Physical Unclonable Feature (PUF) produced by the security component of the object.

3. The method according to claim 1, wherein the data generated by the security component of the object is a random number stored in the security component of the object after generation.

4. The method according to claim 1, wherein the first key is obtained by applying a signature or encryption function to reference digital data derived from the biometric data.

5. The method according to claim 1, wherein the first key is generated in a secure element of a third party and transmitted to the identification object.

6. The method according to claim 1, wherein the initial encryption key is generated by the security component of the identification object, then transmitted to the server.

7. The method according to claim 1, wherein the initial encryption key is generated by the server.

8. The method according to claim 1, wherein the generating generates the first key by introducing a key derivation received from the server.

9. The method according to claim 1, wherein the generating generates the second key by introducing a key derivation received from the server.

10. The method according to claim 1, wherein a plurality of derived public identities is generated and stored on the server or on a plurality of servers in association with a respective derived initial encryption key.

11. The method according to claim 10, wherein the public identity or identities are also transmitted and stored in the identification object.

12. The method according to claim 1, further comprising:
a verification phase for verifying the identity of the individual carrying the identification object, the verification phase including the following steps:
capturing current biometric data of the individual,
generating current data by the security component of the object,
generating a current encryption key from the current biometric data and from the current data generated by the security component of the object,
comparing the current encryption key with the initial encryption key,
in response to the comparison being positive, validating the identity of the individual carrying the identification object, and
in response to the comparison being negative, refuting the identity of the individual carrying the identification object.

13. The method according to claim 12, wherein the comparing is performed in the security component of the identification object.

14. The method according to claim 12, wherein the comparing is performed at the server.

15. An electronic device comprising:
a security component configured to
capture initial biometric data of an individual,
generate of a first key by applying a hash function to the biometric data, wherein the first key is generated in the security component of the identification object,
generate a second key based on data generated by the security component only,
generate an initial encryption key combining the first key and the second key, and
communicate, with a server, a first identity of the individual in association with the initial encryption key, the server generating a public identity by encrypting the first identity using the initial encryption key, and storing the public identity in association with the initial encryption key;
wherein a key derivation function for the initial encryption key is introduced by the server before generation of the public identity.

16. The electronic device according to claim 15, further comprising a device configured to capture biometric data.

17. The electronic device according to claim 15, wherein the security component accesses a memory in which a plurality of public identities is stored.

18. A system for authenticating a holder of an identification object, the system comprising:
at least one authentication server; and
an electronic device including a security component configured to
capture initial biometric data of an individual,
generate of a first key by applying an encryption a hash function to the biometric data, wherein the first key is generated in the security component of the identification object,
generate a second key based on data generated by the security component only,
generate an initial encryption key combining the first key and the second key, and
communicate, with a server, a first identity of the individual in association with the initial encryption key,
wherein the authentication server is configured to generate a public identity by encrypting the first identity using the initial encryption key, and store the public identity in association with the initial encryption key; and
wherein a key derivation function for the initial encryption key is introduced by the authentication server before generation of the public identity.

19. The system according to claim 18, further comprising a plurality of authentication servers each including at least one derived public identity.

* * * * *

UNITED STATES PATENT AND TRADEMARK OFFICE
CERTIFICATE OF CORRECTION

PATENT NO. : 10,007,773 B2  
APPLICATION NO. : 14/382920  
DATED : June 26, 2018  
INVENTOR(S) : Benteo et al.

Page 1 of 1

It is certified that error appears in the above-identified patent and that said Letters Patent is hereby corrected as shown below:

In the Claims

| Column | Line | Error |
|---|---|---|
| 9 (Claim 15, Line 4) | 48 | "generate of a" should read --generate a-- |
| 10 (Claim 18, Line 7) | 27 | "generate of a" should read --generate a-- |
| 10 (Claim 18, Lines 7-8) | 27-28 | "applying an encryption a hash function" should read --applying a hash function-- |

Signed and Sealed this  
Fourth Day of December, 2018

Andrei Iancu  
*Director of the United States Patent and Trademark Office*